United States Patent
Zhou (10) Patent No.: US 7,842,743 B2
(45) Date of Patent: Nov. 30, 2010

(54) STABILISER COMPOSITION FOR HALIDE-CONTAINING POLYMERS

(75) Inventor: Xu Zhou, Singapore (SG)

(73) Assignee: Sun Ace Kakoh (Pte.) Ltd., Jurong Town (SG)

( * ) Notice: Subject to any disclaimer, the term of this patent is extended or adjusted under 35 U.S.C. 154(b) by 95 days.

(21) Appl. No.: 11/911,276

(22) PCT Filed: Apr. 12, 2006

(86) PCT No.: PCT/SG2006/000096

§ 371 (c)(1),
(2), (4) Date: Jun. 27, 2008

(87) PCT Pub. No.: WO2006/110112

PCT Pub. Date: Oct. 19, 2006

(65) Prior Publication Data

US 2009/0030123 A1   Jan. 29, 2009

(30) Foreign Application Priority Data

Apr. 15, 2005  (SG) .............. 200502330-4
Jan. 17, 2006  (WO) .............. PCT/SG2006/000007

(51) Int. Cl.
C08K 5/3462 (2006.01)
(52) U.S. Cl. .............. 524/100; 524/102; 524/567; 524/568; 524/569
(58) Field of Classification Search .......... 524/100, 524/102, 567–569
See application file for complete search history.

(56) References Cited

U.S. PATENT DOCUMENTS

| | | | | |
|---|---|---|---|---|
| 2,726,955 A * | 12/1955 | Parnell | .............. | 430/538 |
| 3,769,269 A * | 10/1973 | Beck et al. | .............. | 524/100 |
| 4,105,627 A | 8/1978 | Sekiguchi et al. | .............. | 260/45.8 |
| 4,957,954 A | 9/1990 | Iizuka et al. | .............. | 524/102 |
| 5,514,505 A * | 5/1996 | Limburg et al. | .............. | 430/41 |
| 5,847,035 A | 12/1998 | Volodarsky et al. | .............. | 524/100 |
| 6,136,900 A | 10/2000 | Kuhn et al. | .............. | 524/99 |
| 6,482,582 B2 * | 11/2002 | Watanabe et al. | .............. | 430/566 |
| 6,835,216 B2 * | 12/2004 | Pratt et al. | .............. | 44/335 |
| 6,835,328 B2 * | 12/2004 | Fakinlede et al. | .............. | 252/400.52 |
| 2005/0101716 A1 * | 5/2005 | Bacaloglu et al. | .............. | 524/425 |
| 2005/0197341 A1 * | 9/2005 | Woolf et al. | .............. | 514/251 |

FOREIGN PATENT DOCUMENTS

| | | |
|---|---|---|
| EP | 0 246 867 | 11/1987 |
| GB | 782812 | 9/1957 |
| JP | 2000273259 | 10/2000 |
| WO | 2006/110112 | 10/2006 |

* cited by examiner

*Primary Examiner*—Peter Szekely
(74) *Attorney, Agent, or Firm*—Woodcock Washburn LLP (57) ABSTRACT

A composition for stabilising halide-containing polymers, said composition comprising compounds represented by the general formula (I) wherein X, Y, and Z are each independently selected from the group consisting of hydrogen, alkyl, alkenyl, alkynyl, amino, and groups having the structure (II) wherein $R_1$ and $R_2$ are each independently selected from the group consisting of hydrogen, alkyl, alkenyl, alkynyl, cycloalkyl, cycloalkenyl, phenyl, phenylalkyl and aryl group, A is oxygen (O) or sulfur (S); and wherein the dashed double line represents an optional double bond.

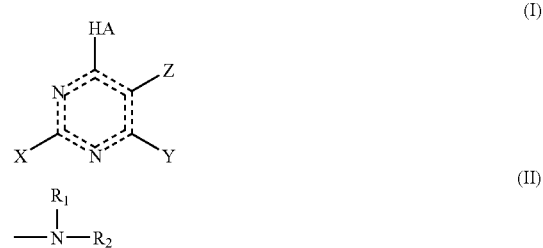

33 Claims, 1 Drawing Sheet

Fig. 1

STABILISER COMPOSITION FOR HALIDE-CONTAINING POLYMERS

CROSS-REFERENCE TO RELATED APPLICATIONS

This application is the U.S. National Stage of International Application No. PCT/SG2006/000096, filed 12 Apr. 2006, which claims the benefit of Singapore Patent Application No. 200502330-4, filed 15 Apr. 2005, the disclosures of which are incorporated herein by reference in their entireties.

TECHNICAL FIELD

The present invention generally relates to a stabiliser composition for Halide-containing polymers, such as chloride containing polymers.

BACKGROUND ART

Halide-containing polymers such as chlorine-containing polymers (ie such as polyvinyl chloride (PVC)) may be thermally unstable. PVC is one of the most important large-volume thermoplastics available in the market. It is also one of the least thermally stable polymers in commercial use. In PVC processing and the subsequent end uses of PVC, heat stabilisers are needed.

A range of additives can be used to stabilise PVC and such PVC stabilisers can be classified into four categories, namely:
  lead stabilisers;
  tin stabilisers;
  mixed metal stabilisers; and
  organic stabilisers.

Lead stabilisers are stabilisers having lead derivatives as the primary stabilising ingredients, which include inorganic salts such as lead tribasic sulfate, lead dibasic phosphite, etc, and lead soaps, such as, for example, stearates, laurates, etc. Lead stabilisers are currently the market dominant stabilisers for PVC.

Tin stabilisers are stabilisers containing alkyl-tin mercaptides or carboxylates as the primary stabilising ingredients. The tin stabilisers are commonly used in stabilising rigid PVC.

Mixed metal stabilisers are stabilisers containing a combination of metal carboxylates such as barium-zinc or calcium-zinc carboxylates. The mixed metal stabilisers containing calcium-zinc carboxylates are an alternative to lead stabilisers and/or tin compound.

Organic stabilisers are stabilisers containing metal-free organic compounds as the primary stabilising agents. Organic stabilisers are free of lead, cadmium, tin, barium, antimony, zinc and other heavy metals.

Commercially, lead is still today's worldwide dominant PVC stabiliser for due to the properties of lead. Due to environmental regulations prohibiting lead, it is desirable that lead be phased out from application in lead stabilisers. Lead-substitutes, which are environmentally friendly and acceptable, fall under two categories, that is calcium-zinc (Ca/Zn) and heavy-metal-free organic based stabilisers. However, zinc chloride, which is generated in PVC stabilised by a Ca/Zn stabiliser in the PVC processing step, is regarded as a toxic substance.

In view of the above, there is a need to provide a stabiliser for thermally stabilising chlorine-containing polymers.

There is also a need to provide a stabiliser that overcomes or at least ameliorates one or more of the disadvantages described above.

There is a need to provide an organic based stabiliser for chlorine-containing polymers such as PVC, which is free from lead, cadmium, tin, barium, antimony, zinc and any other heavy metals.

SUMMARY OF INVENTION

According to a first aspect, there is provided a composition for stabilising halide-containing polymers, said composition comprising compounds represented by the general formula (I):

wherein X, Y, and Z are each independently selected from the group consisting of hydrogen, alkyl, alkenyl, alkynyl, amino, and groups having the structure (II)

wherein $R_1$ and $R_2$ are each independently selected from the group consisting of hydrogen, alkyl, alkenyl, alkynyl, cycloalkyl, cycloalkenyl, phenyl, phenylalkyl and aryl group, A is oxygen (O) or sulfur (S);

wherein the dashed double line "=====" represents an optional double bond; and wherein when said composition is mixed with said halide-containing polymers in use, said composition at least partly inhibits thermal degradation of said halide-containing polymers.

In one embodiment, the halide-containing polymers are chloride-containing polymers.

The composition may further comprise one or more additives selected from the group consisting of: polyol compounds, alkali or alkaline earth metal compounds, alkali or alkaline earth carboxylate compounds, alkali zeolite compounds, fatty acids; hydrotalcite compounds, perchlorate compounds, phosphite and hypophosphite compounds, β-diketone compounds, sterically hindered amine compounds, alkanolamines, glycidyl compounds, phenolic antioxidant compounds and one or more combinations thereof.

According to a second aspect, there is provided a polymer composition comprising:

a halide-containing polymer; and a stabiliser composition comprising compounds represented by the general formula (I):

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl group,
A is oxygen (O) or sulfur (S); and
wherein the dashed double line "=====" represents an optional double bond.

According to a third aspect, there is provided a method of preparing a stabilised halide-containing polymer comprising the steps of:

mixing a material comprising halide-containing polymer resin and a stabiliser composition comprising compounds represented by the general formula (I):

(I)

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl group,
A is oxygen (O) or sulfur (S); and
wherein the dashed double line "=====" represents an optional double bond; and
heating the mixed material for a period so as to at least partially bind the halide-containing resin and stabiliser composition.

According to a fourth aspect, there is provided a composition for stabilising halide-containing polymers, said composition comprising compounds represented by the general formula (I):

(I)

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl group,
A is oxygen (O) or sulfur (S); and
wherein the dashed double line "=====" represents an optional double bond; and
a metal perchlorate salt.

In one embodiment of the second aspect, one or more additives are selected from the group consisting of: perchlorates, hydrotalcites, zeolites, carboxylates, hydrocarbonates, alkanolamines, and hindered amine.

In one embodiment, there is provided a polymer composition comprising:
a chlorine-containing polymer; and
a stabiliser composition as defined in the first aspect.

In one embodiment, there is provided a polyvinyl chloride resin composition comprising polyvinyl chloride resin and a heat stabilising effective amount of a stabiliser composition according to the first aspect.

In one embodiment, there is provided a method of preparing a stabilised chlorine-containing polymers comprising the steps of:

mixing a material comprising chlorine-containing polymer resin and a stabiliser composition as defined in the first aspect; and heating the mixed material for a period so as to at least partially bind the polyvinyl chloride resin and stabiliser composition.

In one embodiment, there is provided a method for stabilising a chlorine-containing polymer comprising mixing said polymer with a stabiliser composition as defined in the first aspect.

In one embodiment, there is provided a stabiliser composition as defined in the first aspect when used for stabilising a chlorine-containing polymer.

DEFINITIONS

The following are some definitions that may be helpful in understanding the description of the present invention. These are intended as general definitions and should in no way limit the scope of the present invention to those terms alone, but are put forth for a better understanding of the following description.

Unless the context requires otherwise or specifically stated to the contrary, integers, steps, or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of elements or integers. Thus, in the context of this specification, the term "comprising" means "including principally, but not necessarily solely".

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations or any two or more of said steps or features.

As used herein, the term "alkyl group" includes within its meaning monovalent ("alkyl") and divalent ("alkylene") straight chain or branched chain saturated aliphatic groups having from 1 to 10 carbon atoms, eg, 1, 2, 3, 4, 5, 6, 7, 8, 9, or 10 carbon atoms. For example, the term alkyl includes, but is not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, decyl, and the like.

The term "lower alkyl group" includes alkyl groups as defined above having from 1 to 6 carbon atoms, more preferably from 1 to 4 carbon atoms.

The term "alkenyl group" includes within its meaning monovalent ("alkenyl") and divalent ("alkenylene") straight or branched chain unsaturated aliphatic hydrocarbon groups having from 2 to 10 carbon atoms, eg, 2, 3, 4, 5, 6, 7, 8, 9, or 10 carbon atoms and having at least one double bond, of either E, Z, cis or trans stereochemistry where applicable, anywhere in the alkyl chain. Examples of alkenyl groups include but are not limited to ethenyl, vinyl, allyl, 1-methylvinyl, 1-propenyl, 2-propenyl, 2-methyl-1-propenyl, 2-methyl-1-propenyl, 1-butenyl, 2-butenyl, 3-butentyl, 1,3-butadienyl, 1-pentenyl, 2-pententyl, 3-pentenyl, 4-pentenyl, 1,3-pentadienyl, 2,4-pentadienyl, 1,4-pentadienyl, 3-methyl-2-butenyl, 1-hexenyl, 2-hexenyl, 3-hexenyl, 1,3-hexadienyl, 1,4-hexadienyl, 2-methylpentenyl, 1-heptenyl, 2-heptentyl, 3-heptenyl, 1-octenyl, 1-nonenyl, 1-decenyl, and the like.

The term "lower alkenyl group" includes alkenyl groups as defined above having from 2 to 6 carbon atoms, more preferably from 2 to 4 carbon atoms.

The term "alkynyl group" as used herein includes within its meaning monovalent ("alkynyl") and divalent ("alkynylene") straight or branched chain unsaturated aliphatic hydrocarbon groups having from 2 to 10 carbon atoms and having at least one triple bond anywhere in the carbon chain. Examples of alkynyl groups include but are not limited to ethynyl, 1-propynyl, 1-butynyl, 2-butynyl, 1-methyl-2-butynyl, 3-methyl-1-butynyl, 1-pentynyl, 1-hexynyl, methylpentynyl, 1-heptynyl, 2-heptynyl, 1-octynyl, 2-octynyl, 1-nonyl, 1-decynyl, and the like.

The term "lower alkynyl group" includes alkynyl groups as defined above having from 2 to 6 carbon atoms, more preferably from 2 to 4 carbon atoms.

The term "cycloalkyl" as used herein refers to cyclic saturated aliphatic groups and includes within its meaning monovalent ("cycloalkyl"), and divalent ("cycloalkylene"), saturated, monocyclic, bicyclic, polycyclic or fused polycyclic hydrocarbon radicals having from 3 to 10 carbon atoms, eg, 3, 4, 5, 6, 7, 8, 9, or 10 carbon atoms. Examples of cycloalkyl groups include but are not limited to cyclopropyl, 2-methylcyclopropyl, cyclobutyl, cyclopentyl, 2-methylcyclopentyl, 3-methylcyclopentyl, cyclohexyl, and the like.

The term "cycloalkenyl" as used herein, refers to cyclic unsaturated aliphatic groups and includes within its meaning monovalent ("cycloalkenyl") and divalent ("cycloalkenylene"), monocyclic, bicyclic, polycyclic or fused polycyclic hydrocarbon radicals having from 3 to 10 carbon atoms and having at least one double bond, of either E, Z, cis or trans stereochemistry where applicable, anywhere in the alkyl chain. Examples of cycloalkenyl groups include but are not limited to cyclopropenyl, cyclopentenyl, cyclohexenyl, and the like.

The term "cycloalkynyl" as used herein, refers to cyclic unsaturated aliphatic groups and includes within its meaning monovalent ("cycloalkenyl") and divalent ("cycloalkenylene"), monocyclic, bicyclic, polycyclic or fused polycyclic hydrocarbon radicals having from 3 to 10 carbon atoms and having at least one triple bond anywhere in the alkyl chain. Examples of cycloalkynyl groups include but are not limited to cyclopropynyl, cyclopentynyl, cyclohexynyl, and the like.

The term "phenyl" as used herein refers to an optionally substituted phenyl group.

The term "phenylalkyl" as used herein refers to an phenyl group appended to a loweralkyl radical including, but not limited to, benzyl, 4-hydroxybenzyl, 4-chlorobenzyl, 1-naphthylmethyl and the like.

The term "aryl" means an optionally substituted monocyclic or polycyclic-aromatic group comprising carbon and hydrogen atoms. Examples of suitable aryl groups include, but are not limited to, phenyl, tolyl, anthracenyl, fluorenyl, indenyl, azulenyl, and naphthyl, as well as benzo-fused carbocyclic moieties.

The term "optionally substituted" as used herein means the group to which this term refers may be unsubstituted, or may be substituted with one or more groups independently selected from alkyl, alkenyl, alkynyl, thioalkyl, cycloalkyl, cycloalkenyl, heterocycloalkyl, halo, carboxyl, haloalkyl, haloalkynyl, hydroxyl, alkoxy, thioalkoxy, alkenyloxy, haloalkoxy, haloalkenyloxy, nitro, amino, nitroalkyl, nitroalkenyl, nitroalkynyl, nitroheterocyclyl, alkylamino, dialkylamino, alkenylamine, alkynylamino, acyl, alkenoyl, alkynoyl, acylamino, diacylamino, acyloxy, alkylsulfonyloxy, heterocycloxy, heterocycloamino, haloheterocycloalkyl, alkylsulfenyl, alkylcarbonyloxy, alkylthio, acylthio, phosphorus-containing groups such as phosphono and phosphinyl, aryl, heteroaryl, alkylaryl, alkylheteroaryl, cyano, cyanate, isocyanate, —C(O)NH(alkyl), and —C(O)N(alkyl)2

The term "halide" as used herein refers to fluorine, chlorine, bromine and iodine.

The term "halide-containing polymer" refers to a polymer material that is in solid form at 20° C. and which contains a halide as defined above.

The term 'stabilised chlorine-containing polymer' or 'stabilised polymer' is to be interpreted broadly to include any chlorine-containing polymer that includes the stabiliser composition disclosed herein.

The term 'unavoidable impurities' is to be interpreted broadly to include material that does not include chlorine-containing polymer material or stabiliser composition constituent material that may be present during the manufacturing process of the stabiliser composition or the stabilised chlorine-containing polymer material.

The term "amino" as used herein refers to groups of the form —NRaRb wherein Ra and Rb are individually selected from the group including but not limited to hydrogen, optionally substituted alkyl, preferably optionally substituted lower alkyl, optionally substituted alkenyl, preferably optionally substituted lower alkenyl, optionally substituted alkynyl, preferably optionally substituted lower alkynyl, and optionally substituted aryl groups.

DISCLOSURE OF EMBODIMENTS

The present invention is further described in the following embodiments, which are included for purpose of illustration and not for limitation of the scope of that which the applicants claim to be the invention.

An exemplary non-limiting embodiment of a stabiliser composition for thermally stabilising halide-containing polymers such as chlorine-containing polymers will now be disclosed. Hereafter, for convenience, reference will be made to "chlorine-containing polymers" or "chloride-containing polymers" for convenience. However, the disclosed composition can be used for any type of halide containing polymers.

The disclosed embodiments describe a novel stabiliser composition comprising compounds represented by formula (I):

(I)

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl group, A is oxygen (O) or sulfur (S); and wherein the dashed double line "=====" represents an optional double bond. It will be appreciated that said compounds of formula (I) do not contain more than three double bonds in the aromatic ring structure.

In one embodiment, the disclosed compounds represented by formula (IA):

(IA)

In another embodiment, the disclosed compounds represented by formula (IB):

(IB)

In one embodiment, the X, Y, Z, $R_1$ and $R_2$ are each independently selected from the group consisting of a lower alkyl, lower alkenyl, and a lower alkynyl.

The stabiliser composition may be used as a thermal stabiliser for stabilising a chlorine-containing polymer.

The stabiliser composition may comprise two or more compounds of formula I that are linked together by a covalent bond between the atoms A. In one embodiment, when one of X, Y, and Z are amino or have the structure (II), two or more compounds of formula I are linked together by a covalent bond between the nitrogen atoms.

The stabiliser composition may comprise two or more compounds of formula I that are linked together by a covalent bond.

The stabiliser may comprise one or more additive compounds. The stabiliser may also comprise one or more lubricants.

The stabiliser composition may be mixed with a chlorine-containing polymer to form a stabilised chlorine-containing polymer. The stabilised chlorine-containing polymer may contain compounds of formula I in an amount by weight selected from the group consisting of: about 0.01% to about 20%; about 0.01% to about 16%; about 0.1% to about 15%; about 0.15% to about 10%; about 0.2% to about 8%; about 0.2% to about 6%; and about 0.2% to about 4%.

In one embodiment, the chlorine-containing polymer may undergo extrusion to form a pipe made from the chlorine-containing polymer having compounds of formula I in an amount by weight between the range of about 0.05% to about 1%.

In another embodiment, the chlorine-containing polymer may undergo injection molding to form a molded shape made from the chlorine-containing polymer having compounds of formula I in an amount by weight between the range of about 0.1% to about 3.5%.

The stabilised chlorine-containing polymer may comprise one or more additive compounds in an amount by weight selected from the group consisting of: about 0.09% to about 16%; about 0.1% to about 15%; about 0.15% to about 10%; about 0.2% to about 8%; about 0.2% to about 6%; and about 0.2% to about 4%.

In one embodiment, the chlorine-containing polymer may undergo extrusion to form a pipe made from the chlorine-containing polymer having one or more additive compounds in an amount by weight between the range of about 0.1% to about 2%.

In another embodiment, the chlorine-containing polymer may undergo injection molding to form a molded shape made from the chlorine-containing polymer having one or more additive compounds in an amount by weight between the range of about 0.3% to about 3%.

The stabilised chlorine-containing polymer may comprise one or more lubricants in an amount by weight selected from the group consisting of: about 0.09% to about 21%; about 0.1% to about 20%; about 0.15% to about 10%; about 0.2% to about 8%; about 0.3% to about 6%; and about 0.4% to about 4%.

In one embodiment, the chlorine-containing polymer may undergo extrusion to form a pipe made from the chlorine-containing polymer having one or more lubricants in an amount by weight between the range of about 0.5% to about 2%.

In another embodiment, the chlorine-containing polymer may undergo injection molding to form a molded shape made from the chlorine-containing polymer having one or lubricants in an amount by weight between the range of about 0.8% to about 3%.

Amino-Substituted Pyrimidine Compounds

The amino-substituted pyrimidine compounds may be amino-substituted hydroxy-pyrimidines or amino-substituted mercapto-pyrimidines.

The amino-substituted pyrimidine compounds may be selected from the list consisting of: 2-Amino-6-hydroxypyrimidine, 2-amino-6-mercaptopyrimidine, 2-N-methylamino-6-hydroxypyrimidine, 2-N-2-propylamino-6-hydroxypyrimidine, 4-amino-6-hydroxypyrimidine, 4-amino-6-mercaptopyrimidine, 4-N-phenylamino-6-hydroxypyrimidine, 4-methylamino-6-hydroxypyrimidine, 4-octylamino-6-hydroxypyrimidine, 5-amino-6-hydroxypyrimidine, 5-amino-6-mercaptopyrimidine, 5-N-butylamino-6-hydroxypyrimidine, 5-N-methyl amino-6-mercaptopyrimidine, 2,4-diamino-6-hydroxypyrimidine, 2,4-diamino-6-mercaptopyrimidine, 2,4-N,N'-dimethyldiamino-6-hydroxypyrimidine, 4,5-diamino-6-hydroxypyrimidine, 4,5-diamino-6-mercaptopyrimidine, 4,5-N,N'-dipropyldiamino-6-hydroxypyrimidine, 4-N-methylamino-5-N-octylamino-6-hydroxypyrimidine, 2,4-diamino-6-hydroxypyrimidine, 2,6-diamino-6-hydroxypyrimidine, 2,6-diamino-6-mercaptopyrimidine, 2,6-N,N'-dibutyldiamino-6-hydroxypyrimidine, 2-N-butylamino-6-N-phenylamino-6-hydroxypyrimidine, 2,4,5-triamino-6-hydroxypyrimidine, 2,4,5-triamino-6-mercaptopyrimidine, 2-N-methylamino-4-N-butylamino-5-N-phenylamino-6-hydroxypyrimidine and one or more combinations thereof.

Additive Compounds

The stabiliser composition may further comprise one or more additives selected from the group consisting of: polyols, alkali or alkaline earth metal compounds, alkali or alkaline earth carboxylates, alkali zeolites, hydrotalcite, perchlorate compounds, phosphites and hypophosphites, β-diketones, sterically hindered amines, alkanolamines, glycidyl compounds, phenolic antioxidants and one or more combinations thereof.

The amount of additive compounds present in a stabilised chlorine-containing polymer may be selected from the group consisting of: 0.001% to 15%; 0.01% to 10%; 0.1% to 8%; 0.1% to 6%; 0.1% to 5%; 0.1% to 4%; 0.1% to 3%; 0.1% to 2% and 0.1% to 0.6%.

The Polyols

The polyols may be selected from the group consisting of: pentaerythritol, dipentaerythritol, tripentaerythritol, bistrimethylolpropane, bistrimethylolethane, trismethylolpropane, polyvinylalcohol, sorbitol, mannitol, tetramethylolcyclohexanol, tetramethylolcyclopentanol, tetramethylolcyclopyranol, glycerol, diglycerol, polyglycerol, thiodiglycerol, tris(hydroxyethyl) isocyanurate; tris(hydroxypropyl) isocyanurate and one or more combinations thereof.

The Alkali or Alkaline Earth Metal Compounds

The alkali or alkaline earth metal compound may be selected from the group consisting of: oxides, hydroxides, sulfides, silicates, phosphates, borates, carbonates and hydrocarbonates of alkali metals and alkaline earth metals, and one or more combinations thereof.

The alkali metals may be selected from the group consisting of: lithium, sodium, and potassium and one or more combinations thereof.

The alkaline earth metals may be selected from the group consisting of: magnesium, calcium, strontium, and barium and one or more combinations thereof.

The alkali or alkaline earth metal compounds may be basic alkali or alkaline earth metals selected from the group consisting of: calcium hydroxide, magnesium hydroxide, lithium hydroxide, sodium borate, sodium silicate and one or more combinations thereof.

The Alkali or Alkaline Earth Carboxylates

The alkali or alkaline earth carboxylates may be selected from the group consisting of: sodium palmitate, potassium palmitate, magnesium palmitate, sodium hydroxystearate, calcium hydroxystearate, magnesium hydroxystearate, sodium stearate, lithium stearate, potassium stearate, magnesium stearate, calcium stearate, sodium acetate, potassium acetate, lithium acetate, sodium propionate, potassium propionate, sodium butyrate, sodium malonate, sodium adipate, sodium benzoate and one or more combinations thereof.

The Alkali Aluminosilicates

The alkali aluminosilicates may be selected from the group consisting of: sodium aluminosilicate, potassium aluminosilicate, lithium aluminosilicate and one or more combinations thereof.

The Fatty Acids

Aliphatic carboxylic acids having at least one carboxy group in the molecule may be used. Exemplary carboxylic acids are glutaric acid, adipic acid, pimelic acid, suberic acid, axelaic acid, sebacic acid or dimerised or trimerised linoleic acid, acrylic acid and methacrylic acid, caproic acid, caprylic acid, lauric acid, myristic acid, palmitic acid, stearic acid and pelargonic, behenic, oleic acid etc. as well as any salts of these fatty acids.

The Hydrotalcites

Any hydrotalcites can be used. Exemplary hydrotalcites include, but are not limited to, $Al_2O_3 6MgO.CO_2.12H_2O$, $Mg4.5Al_2(OH)_{13}CO_3.3.5H_2O$, $4MgO.Al_2O_3.CO_2.9H_2O$, $4MgO.Al_2O_3.CO_2.6H_2O$, $Mg_6Al_2 (CO_3)(OH)_{16}.4H_2O$, $Mg_4.5Al_2 (CO_3)(OH)_{13}.3H_2O$ and anhydrous forms thereof.

The Perchlorate Compounds

The perchlorate compounds may be selected from compounds having the formula $M(ClO_4)_n$, wherein M is selected from the group consisting of: Li, Na, K, Mg, Ca, Sr, Zn, Al, La or Ce, and wherein n is 1, 2 or 3.

The perchlorate compounds may be complexed with alcohols (polyols, cyclodextrins) or ether alcohols or ester alcohols. The ester alcohols include also the polyol partial esters. Also suitable in the case of polyhydric alcohols or polyols are their dimers, trimers, oligomers and polymers, such as di-, tri-, tetra- and poly-glycols, and di-, tri- and tetra-pentaerythritol or polyvinyl alcohol in various degrees of polymerisation.

The perchlorate compounds can be introduced in various known forms, for example in the form of a salt or an aqueous solution applied to a substrate, such as PVC, calcium silicate, zeolites or hydrotalcites, or bound in a hydrotalcite by chemical reaction.

Phosphites and Hypophosphites

The phosphites may be selected from the group consisting of: triphenyl phosphite, diphenyl alkyl phosphites, phenyl dialkyl phosphites, tris-(nonylphenyl) phosphite, trilauryl phosphite, trioctadecyl phosphite, distearyl-pentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,6-di-tert-butyl-4-methylphenyl)-pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl-sorbitol triphosphite, bis(2,4-di-tert-butyl-6-methylphenyl)methyl phosphite, bis(2,4-di-tert-butyl-6methylphenyl)ethyl phosphite, phenyldidecyl phosphite, (2,4-di-tert-butylphenyl)-di-dodecyl phosphite, (2,6di-tert-butylphenyl)-di-dodecyl phosphite distearylpentaerythritol diphosphite and one or more combinations thereof.

The hypophosphite may be selected from the group consisting of: sodium hypophosphite, lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, tetraethylammonium hypophosphite, N-cetylpyridinium hypophosphite and tetraphenylphosphonium hypophosphite, and one or more combinations thereof.

The β-Diketones

The β-diketones may be selected from the group consisting of: dibenzoylmethane; stearoylbenzoylmethane, benzoyl 2,4-methylenedioxy benzoylmethane; benzoyl 3,5-dimethylbenzoyl methane; benzoyl 3-methylbenzoylmethane; benzoyl 4-methyl benzoylmethane; 3-methylbenzoyl 4-methylbenzoylmethane; benzoyl 4-chlorobenzoylmethane; benzoyl 2-bromobenzoylmethane; benzoyl 3,5-dichlorobenzoylmethane; benzoyl 2-nitrobenzoylmethane; benzoyl-2,3,4-trimethylbenzoylmethane; benzoyl-2,3,5-trichlorobenzoylmethane; benzoylstearoylmethane; 3-methylbenzoylstearoylmethane 3,4-dichlorobenzoylstearoylmethane benzoyl heptadecanoylmethane; 3-methylbenzoyltetradecanoylmethane; 2-methylbenzoyllauroylmethane; 3-nitrobenzoylmyristoylmethane; 2,3-ethoxybenzoyl palmitoylmethane; 2-methoxy benzoylstearoylmethane, and one or more combinations thereof.

The Sterically Hindered Amines

The sterically hindered amines may be selected from the group consisting of: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octyl-amino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, the condensate of N,N'-bis (2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine; N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5] decane, and one or more combinations thereof.

The Alkanolamine

The alkanolamine may be selected from the group consisting of: ethanolamine, tris-ethanolamine, propanolamine, tris-propanolamine, butanolamine, tris(2-hydroxy-1-propyl) amine; tris(2-hydroxy-ethyl)amine; bis(2-hydroxyethyl) (2-hydroxy-1-propyl)amine; bis(2-hydroxy-1-propyl) (2-hydroxyethyl)amine; mono(2-hydroxy-ethyl)amine; bis(2-hydroxy-ethyl)amine; mono(2-hydroxy-1-propyl)amine; bis(2-hydroxy-1-propyl)amine.

The Glycidyl Compounds

The glycidyl compounds may be selected from the group consisting of: liquid bisphenol-A-diglycidyl ethers; solid bisphenol-A-diglycidyl ethers; liquid bisphenol-F-diglycidyl ethers; solid polyglycidyl ethers of tetraphenylethane; solid and liquid polyglycidyl ethers of phenol/formaldehyde novolak; solid and liquid polyglycidyl ethers of o-cresol/formaldehyde novolak; liquid glycidyl ethers of alcohols; liquid glycidyl ethers of carboxylic acids; solid heterocyclic epoxy resins (triglycidyl isocyanurate); liquid cycloaliphatic epoxy resins; liquid N,N,O-triglycidyl ethers of p-aminophenol; tetraglycidyl-4-4'-methylenebenzamine or N,N,N',N'-tetraglycidyl-diaminophenylmethane.

The Phenolic Antioxidant

The phenolic antioxidant may be selected from the group consisting of: 2,2-bis(4-hydroxyphenyl)propane, esters of 3,5-di-tert-butyl-4-hydroxyphenylpropionic acid with octadecanol or pentaerythritol, and tris(2,4-di-tert-butylphenyl) phosphite, tetrakis[methylene 3-(3',5'-di-tert-butyl-4'-hydroxyphenyl)propionate]methane, octadecyl 3-(3',5'-di-tert-butyl-4'-hydroxyphenyl)propionate, octadecyl-3,5-di-tert-butyl-4-hydroxyhydrocinnamate, di-n-octadecyl-3,5-di-tert-butyl-4-hydroxybenzyl phosphonate, 2,6-di-t-butyl-4-methylphenol, and tris-2,4,6-(3,5-di-t-butyl-4-hydroxybenzyl)isocyanurate and one or more combinations thereof.

Commercially available phenolic antioxidants that may be used are available form Great Lakes Chemical Corporation of Indianapolis, Ind. USA and are available under the brand names Anox™ and Lowinox™.

The Lubricants

The phenolic antioxidant may be selected from the group consisting of: glycerol monooleate, glycerol dioleate, glycerol monostearate; fatty alcohols having chain lengths in the range from $C_{16}$ to $C_{18}$; phthalic acid esters of fatty alcohols having chain lengths in the range from $C_{16}$ to $C_{18}$ and hydrogenated castor oil such as the glycerol ester of 12-hydroxystearic acid; esters of polyhydric alcohols and short chain monocarboxylic acids such as glycerol monostearate; ethylene glycol dilaurate; 2-ethylhexane diol-1,3-distearate; ethylene glycol di-2-ethylhexanoate and octylene glycol dicaprylate; and esters of dicarboxylic acids with short chain monohydroxy-alcohols, such as diisooctyl sebacate; dilauryl azelate; oxidised polyethylene waxes, polyethylene waxes; paraffin waxes; carboxylic acids such as stearic acid, 12-hydroxystearic acid and montanic acid; carboxylates such as calcium stearate, magnesium stearate and sodium stearate; amides such as ethylene bis-stearamide and one or more combinations thereof.

The lubricants present in a stabilised halogen containing polymer, may be selected from the group consisting of: 0.01% to 2%; 0.05% to 1.8%; 0.1% to 1.5%; 0.15% to 1.45%; 0.2% to 1.4%; 0.5% to 1.35%; 1% to 1.3%; 1.1% to 1.3%; 1.2% to 1.3% and 1.25% to 1.28%.

The Chlorine-Containing Polymer

The chlorine-containing polymer that may be stabilised by the disclosed stabiliser composition may be selected from the group consisting of: chlorinated polyolefin, chlorinated polyolefin copolymers; polymer blends containing a chlorinated polyolefin homopolymer or copolymer; vinyl chloride homopolymers; vinylidene chloride homopolymers; vinyl chloride copolymers; vinylidene chloride copolymers and polymer blends containing vinyl chloride homopolymer or copolymers and one or more combinations thereof.

The vinyl chloride homopolymers, vinyl chloride copolymers and polymer blends containing vinyl chloride homopolymers or vinyl chloride copolymers may be selected from the group consisting of: polyvinyl chloride; polyvinylidene chloride; copolymers of vinyl chloride with a copolymerizable ethylenically unsaturated monomer such as vinylidene chloride; methyl alpha chloracrylate; vinyl chloroethyl ether; 1-fluoro-1-chloroethylene; chloroacrylonitrile; allylidene diacetate; chloroallylidene diacetate; and polymer blends such as blends of polyvinyl chloride and polyethylene; polyvinyl chloride and chlorinated polyethylene; polyvinyl chloride and polymethyl methacrylate; polyvinyl chloride and polybutylmethacrylate; polyvinyl chloride and polystyrene; polyvinyl chloride and acrylonitrile-butadiene-styrene copolymer; and polyvinyl chloride and polyethylene and polymethy methacrylate, and one or more combinations thereof.

The vinyl chloride copolymers may be selected from the group consisting of: vinyl chloride-vinyl acetate copolymer, vinyl chloride-vinylidene chloride copolymer, vinyl chloride-trichloroethylene copolymer and vinyl chloride-2-ethylhexyl acrylate copolymer.

Preparation of the Stabilised Chlorine-Containing Polymer

The stabiliser composition and a chlorine-containing polymer such as polyvinyl chloride (PVC) are mixed in a mixing device to form a substantially homogenous mixture.

The amount of stabiliser composition present in the homogenous mixture may be in the range selected from the group consisting of: 0.5% to 10%; 1% to 7.5%; 1.2% to 6%; 1.5% to 5%; 1.7% to 4.5%; 2% to 4%; 2% to 3.5%; 2% to 3% and 2.3% to 2.7%. In one embodiment, the amount of stabiliser composition present in the homogenous mixture is about 2.4%.

The stabiliser composition and the chlorine-containing polymer may initially be in the form of a powder that may be substantially homogeneously mixed.

The homogenous mixture may be heated at an elevated temperature to cause the stabiliser composition powder and the chlorine-containing polymer powder to at least partially bind. The heating temperature may be in the range between 90° C. to 120° C. or 100° C. to 110° C.

The heating may occur for a period of time selected from the group consisting of: 10 minutes to 1000 minutes; 20 minutes to 800 minutes; 25 minutes to 600 minutes; 30 minutes to 400 minutes; 35 minutes to 300 minutes; 40 minutes to 200 minutes; 45 minutes to 120 minutes; and 50 minutes to 90 minutes.

The stabilised chlorine-containing polymer is allowed to cool and may be used as a material for further processing.

In one embodiment, the stabilised chlorine-containing polymer is placed within an extrusion device such as TWP-110-PVC twin screw extruder manufactured by Foshan Plastic Machinery Co., Ltd of Foshan, Guangdong province, China.

In another one embodiment, the stabilised chlorine-containing polymer is placed within an injection molding device such as IS-GS/GT injection molding machine manufactured by Toshiba Machine Co., Ltd. of Numazu-shi, Shizuoka-ken, Japan.

MODES FOR CARRYING OUT THE INVENTION

Non-limiting examples of the invention will be further described.

DETAILED DESCRIPTION OF FIGURES

THE ORGANIC STABILISER COMPOUND

The amino-substituted pyrimidine compounds are commercially available from Sigma-Aldrich Company of St. Louis, Mo., United States of America and include: 2-Amino-6-hydroxypyrimidine, 2-amino-6-mercaptopyrimidine, 2-N-methylamino-6-hydroxypyrimidine, 2-N-2-propylamino-6-hydroxypyrimidine, 4-amino-6-hydroxypyrimidine, 4-amino-6-mercaptopyrimidine, 4-N-phenylamino-6-hydroxypyrimidine, 4-methylamino-6-hydroxypyrimidine, 4-octylamino-6-hydroxypyrimidine, 5-amino-6-hydroxypyrimidine, 5-amino-6-mercaptopyrimidine, 5-N-butylamino-6-hydroxypyrimidine, 5-N-methyl amino-6-mercaptopyrimidine, 2,4-diamino-6-hydroxypyrimidine, 2,4-diamino-6-mercaptopyrimidine, 2,4-N,N'-dimethyldiamino-6-hydroxypyrimidine, 4,5-diamino-6-hydroxypyrimidine, 4,5-diamino-6-mercaptopyrimidine, 4,5-N,N'-dipropyldiamino-6-hydroxypyrimidine, 4-N-methylamino-5-N-octylamino-6-hydroxypyrimidine, 2,6-diamino-6-hydroxypyrimidine, 2,6-diamino-6-mercaptopyrimidine, 2,6-N,N'-dibutyldiamino-6-hydroxypyrimidine, 2-N-butylamino-6-N-phenylamino-6-hydroxypyrimidine, 2,4,5-triamino-6-hydroxypyrimidine, 2,4,5-triamino-6-mercaptopyrimidine, 2-N-methylamino-4-N-butylamino-5-N-phenylamino-6-hydroxypyrimidine.

Example 1

A stabiliser composition was made by stirring together the following components in the amounts indicated below:

0.3 parts of 2,4-diamino-6-hydroxypyrimidine obtained from ScienceLab.com, Inc. of Kingwood, Tex., United States of America;

0.2 parts pentaerythritol additive stabiliser from US Petrochemical Industries, Inc., of Houston, Tex., United States of America;

0.45 parts hydrotalcite additive stabiliser from Minerals Technologies Inc. of New York, United States of America;

0.05 parts octadecyl-3,5-di-tert-butyl-4-hydroxyhydrocinnamate additive stabiliser obtained from Ciba Specialty Chemicals Corporation of Tarrytown, N.Y., United States under the brand name Irganox 1076™;

0.1 part oxidized polyethylene wax from Clariant Corporation, of Charlotte, N.C., United States of America;

1.0 part polyethylene wax from Clariant Corporation, of Charlotte, N.C., United States of America;

0.4 parts calcium stearate from Astro Chemicals, Inc, of Springfield Mass.; and 0.4 parts glyceryl mono stearate from Acme-Hardesty of Blue Bell, Pa., United States of America.

The stabiliser composition was prepared by mixing the mixture in a mixer for 30 minutes under ambient temperature and atmospheric pressure. The stabiliser composition was then mixed with 100 parts by weight PVC resin, 3.0 parts of $CaCO_3$, 1.2 parts of $TiO_2$, and 0.001 parts of pigment at 105° C. to produce a PVC compound (PVC 1A). A comparative PVC without the stabiliser composition was and with Pb stabiliser was also prepared (comparative PVC 1B) and mixed at 105 degree C.

The compositions of PVC 1A and comparative PVC 1B are shown in Table I below:

TABLE I

| Composition | PVC 1A | Comparative PVC 1B |
|---|---|---|
| PVC Resin K66 | 100 parts | 100 parts |
| 2,4-diamino-6-hydroxypyrimidine | 0.3 parts | — |
| Pentaerythritol | 0.2 parts | — |
| Hydrotalcite | 0.45 parts | — |
| Octadecyl-3,5-di-tert-butyl-4-hydroxyhydrocinnamate | 0.05 | — |
| Oxidized Polyethylene wax | 0.1 | — |
| Polyethylene wax | 1.0 | — |
| Calcium Stearate | 0.4 | — |
| Gylcerol Mono Stearate | 0.4 | — |
| Pb stabilizer composition | — | 2.7 parts |
| $CaCO_3$ | 3.0 parts | 3.0 parts |
| $TiO_2$ | 1.2 parts | 1.2 parts |
| Pigment | 0.001 parts | 0.001 parts |

PVC 1A and comparative PVC 1B underwent a plant trial for rigid pipe extrusion to produce 40 mm (diameter) pressure pipes using a KMD2-90 extruder manufactured by Krauss-Maffei Process Technology AG of Munich, Germany, under the process parameters shown in Table II.

TABLE II

| Process Parameters | PVC 1A | Comparative PVC 1B |
|---|---|---|
| Screw Speed (1/min) | 25 | 25 |
| Mass Temperature (c.) | 188 | 187 |
| Screw Torque (%) | 60 | 60 |
| Output (M/min.) | 4.38 | 4.37 |
| Visual Appearance of the Product | Good | Good |

Figure 1:
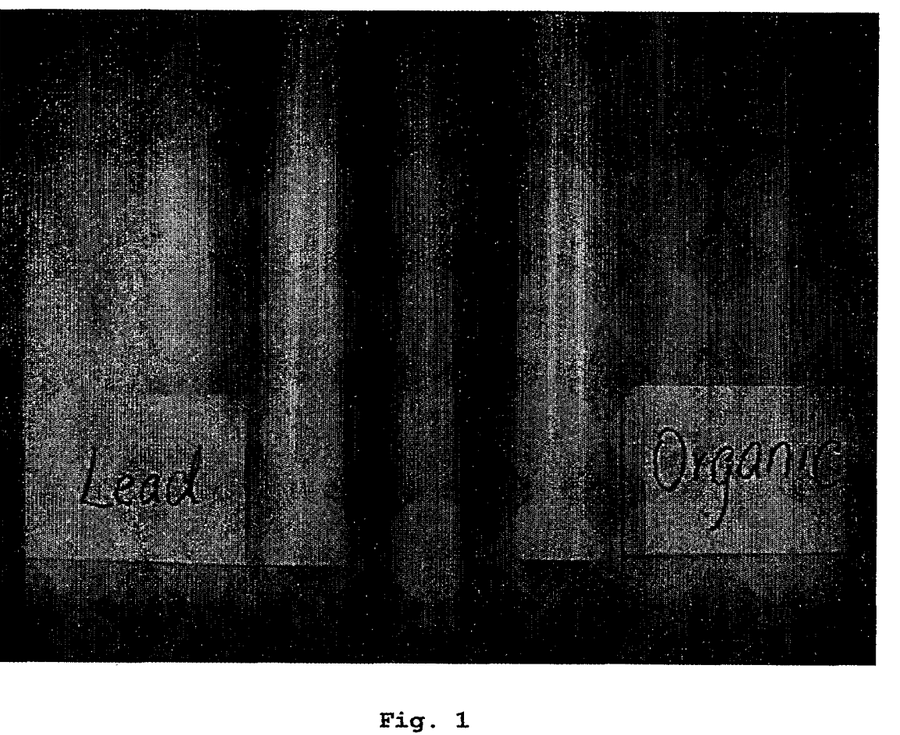
FIG. 1 shows a picture of a chlorine-containing polymer (PVC 1A) with a stabilised composition next to a lead chlorine-containing polymer (comparative PVC 1B) that has been stabilised with lead.

The visual appearance of the PVC 1A and comparative PVC 1B is shown in FIG. 1. FIG. 1 shows that the PVC 1A had good colour hold and was comparable to the PVC 1B, which contains lead.

In view of the above, it is concluded that the visual appearance of the product is the same as the PVC containing lead as stabiliser. Accordingly, the stabiliser composition that was used in PVC 1A provides a substituted stabiliser to the use of lead as a stabiliser.

Product Test Results

The trial pipe product made from PVC 2A was tested according to standard methods known in the art and the results of the test were shown in Table III below:

TABLE III

| Tests | Results | Parameter Requirements |
|---|---|---|
| Heat Reversion Test | 3.1% | Maximum 5% |
| Impact Test | Passed | Maximum 3 failures among 14 samples |
| Hydrostatic Test | Passed | No cracks |
| Resistance to Acetone | Passed | No delamination |
| Softening Point Test | 80 C. | Minimum 75 degree C. |
| Opacity Test | 0.08% | Maximum 0.2% |

Example 2

Rigid injection molding was carried out to demonstrate the performance of the stabiliser composition compared to commercially available Pb stabilisers. 0.5 parts of 2,4-diamino-6-hydroxypyrimidine obtained from ScienceLab.com, Inc. of Kingwood, Tex., United States of America was mixed with the following:

0.3 parts pentaerythritol additive stabiliser from US Petrochemical Industries, Inc., of Houston, Tex., United States of America;

0.7 parts hydrotalcite additive stabiliser from Minerals Technologies Inc. of New York, United States of America;

0.8 parts Zeolite additive stabiliser from Zeolite Australia Ltd of South Melbourne, Victoria, Australia; and 0.1 parts octadecyl-3,5-di-tert-butyl-4-hydroxyhydrocinnamate additive stabiliser obtained from Ciba Specialty Chemicals Corporation of Tarrytown, N.Y., United States under the brand name Irganox 1076™;

0.3 part oxidized polyethylene wax from Clariant Corporation, of Charlotte, N.C., United States of America;

1.5 part polyethylene wax from Clariant Corporation, of Charlotte, N.C., United States of America; and 0.8 parts calcium stearate from Astro Chemicals, Inc, of Springfield Mass.

A heat stabiliser composition was made by stirring together the following components in the amounts indicated in Table IV below:

TABLE IV

| Composition | PVC 2A | PVC 2B |
|---|---|---|
| PVC K58 | 100 parts | 100 parts |
| Processing aid | 1.0 parts | 1.0 parts |
| $TiO_2$ | 1.5 parts | 1.5 parts |
| $CaCO_3$ | 3.0 parts | 3.0 parts |
| 2,4-diamino-6-hydroxypyrimidine | 0.5 parts | — |
| Pentaerythritol | 0.3 parts | — |
| Hydrotalcite | 0.7 | — |
| Zeolite | 0.8 | — |
| Irganox | 0.1 | — |
| Polyethylene wax | 0.3 | — |
| Calcium stearate | 1.5 | — |
| Glyceryl mono stearate | 0.8 | — |
| Pb stabilizer composition | — | 5.0 parts |

The Composition 2A and Composition 2B were mixed in a stirred tank reactor for 5 minutes at 105° C. temperature and atmospheric pressure to respectively form PVC polymers 2A and 2B.

PVC polymers 2A and 2B were subjected to rigid injection molding using an injection molding machine (NC-8300) supplied by NISSEI Plastic Industrial Co. Ltd.

Injection Molding Trial Run

The trial run of the PVC polymers 2A and 2B results are tabulated in Table V as follows:

TABLE V

| Results | PVC 2A | PVC 2B |
|---|---|---|
| Process Parameters | | |
| Total Cycle Time (sec.) | 58 | 57 |
| Black Pressure (Mpa) | 1.0 | 1.0 |
| Peak Injection Pressure (Mpa) | 120 | 122 |
| Injection Time (sec.) | 8.8 | 8.4 |
| Screw Back Time (sec.) | 33 | 33 |
| Molded Part | | |
| 'a | 0.21 | 0.24 |
| 'b | 2.36 | 2.29 |
| Charpy Impact (KJ/m2) | 5.6 | 5.4 |
| Vicat Softening Point (deg o) | 81 | 80 |

It can be seen from Table V that PVC 2A has similar mechanical stability properties to PVC 2B. Accordingly, the stabilizer composition that is contained within PVC 2A can be used as a direct commercial substitute for PVCs that have been stabilised using lead.

Example 3

Part A. Experimental Procedure

Roll Milling

The ingredients from the formula tabulated in Table VI of part B below were mixed thoroughly at the room temperature to form a powder blend. The blend then was thenn milled for five minutes at 180° C. on a two-roll milling machine to form a PVC mill sheet.

Congo Red Test Procedure

The formed mill sheet was cut into pieces, which were then poured into a test tube, the opening of which was covered with cotton. A piece of Congo Red indicator paper (Whatman PLC, United Kingdom) was inserted into the test tube through the cotton. The test tube with the sample was immersed into an oil bath and heated to 190° C.

The time from when the test tube was inserted and the instance when the color of the Congo Red indicator changed to a distinct blue at the lower end of the paper was recorded. The recorded time is hereafter referred to as "Congo Red time". Generally, the greater the Congo Red time obtained, the better long term heat stability of the PVC sample that is stabilized by the stabilizer composition of the PVC.

Dynamic Color Testing Procedure

The blend of the formula tabulated in Table VI of part B below was mixed thoroughly into a powder blend. The compound blend was then compressed into a fused chip at 180° C. on a Brabender™ Plasticorder machine (Brabender GmbH und Co. KG, Germany). The color of the fused chip is hereafter designated as "dynamic color", which represents the color hold performance of the PVC sample stabilized by the specified PVC heat stabilizer.

Part B

TABLE VI

| Composition | 3A (PHR) | Comparative 3B(PHR) |
|---|---|---|
| PVC K66 | 100 parts | 100 parts |
| DAHP* | 0.3 parts | 0.3 parts |
| Sodium perchlorate | 0.1 parts | Nil |
| Hydrotalcite | 0.3 parts | 0.3 parts |
| PE wax | 1.0 parts | 1.0 parts |
| Calcium stearate | 0.5 parts | 0.5 parts |
| Calcium carbonate | 3.0 parts | 3.0 parts |

*DAHP: 2,4-diamino-6-hydroxypyrimidine.

Part C. Results

TABLE VII

| Formulations | 3A | Comparative 3B |
|---|---|---|
| Congo Red Time | 26 Minutes | 15 Minutes |
| The 10-Minute Dynamic Color* | 2 | 2 |

*Dynamic color is rated as: 1-excellent; 2-good; 3-fair; 4-poor; 5-very bad.

It can be seen from Table VII above that the long-term heat stability performance dramatically improved by further addition of a small quantity of sodium perchlorate (a metal perchlorate) into the comparative stabilizer composition containing DAHP.

Example 4

Part A. Experimental

The ingredients from the formula tabulated in Table VIII in Part B below were subjected to the same "Roll Milling", "Dynamic Color Testing" and "Congo Red Test" procedure as described above for Experiment 3, except for the Congo Red Test, the heating was undertaken at 200° C.

Part B. Formulae

TABLE VIII

| Composition | 4A (PHR) | Comparative 4B (PHR) |
|---|---|---|
| PVC K58 | 100 parts | 100 parts |
| DAHP | 0.2 parts | 0.2 parts |
| Sodium perchlorate | 0.1 parts | 0.1 parts |
| Triethanolamine | 0.1 parts | Nil |
| Hydrotalcite | 1.0 parts | 1.0 parts |
| PE wax | 0.5 parts | 0.5 parts |
| Calcium stearate | 1.0 parts | 1.0 parts |
| Ester wax | 1.0 parts | 1.0 parts |
| Calcium carbonate | 3.0 parts | 3.0 parts |
| Processing aid | 1.0 parts | 1.0 parts |

Part C. Results

TABLE IX

| Formulations | 4A | Comparative 4B |
|---|---|---|
| The 10-Minute Dynamic Color* | 2 | 3 |
| Congo Red Time | 32 Minutes | 30 Minutes |

*Dynamic color is rated as: 1-excellent; 2-good; 3-fair; 4-poor; 5-very bad.

The color hold performance is significantly enhanced by further addition of triethanolamine (an alkanolamine) into the comparative stabilizer composition containing DAHP and sodium perchlorate.

Example 5

A. Experimental

The ingredients from the formula tabulated in Table X in Part B below were subjected to the same "Roll Milling", "Dynamic Color Testing" and "Congo Red Test" procedure as described above for Experiment 3, except for the Congo Red Test, the heating was undertaken at 200° C.

Part B. Formulae

TABLE X

| Composition | 5A1 (PHR) | 5A2 (PHR) | Comparative 5B (PHR) |
|---|---|---|---|
| PVC K58 | 100 parts | 100 parts | 100 parts |
| DAHP | 0.4 parts | 0.4 parts | 0.4 parts |
| Sodium perchlorate | 0.1 parts | 0.1 parts | 0.1 parts |
| THEIC* | 0.5 parts | 0.5 parts | Nil |
| TNPP** | Nil | 0.3 parts | Nil |
| Hydrotalcite | 1.0 parts | 1.0 parts | 1.0 parts |
| PE wax | 0.5 parts | 0.5 parts | 0.5 parts |
| Calcium stearate | 1.0 parts | 1.0 parts | 1.0 parts |
| Ester wax | 1.0 parts | 1.0 parts | 1.0 parts |
| Calcium carbonate | 3.0 parts | 3.0 parts | 3.0 parts |
| Processing aid | 1.0 parts | 1.0 parts | 1.0 parts |

*THEIC: tris(hydroxyethyl) isocyanurate.
**TNPP: tris (nonylphenyl) phosphate.

Part C. Results

TABLE XI

| Formulations | 5A1 | 5A2 | Comparative 5B |
|---|---|---|---|
| The 10-Minute Dynamic Color* | 2 | 1 | 3 |
| Congo Red time | 28 Minutes | 30 Minutes | 28 Minutes |

*Dynamic color is rated as: 1-excellent; 2-good; 3-fair; 4-poor; 5-very bad.

The color hold performance is markedly improved by further addition of THEIC (a polyol) and TNPP (a phosphite) into the comparative stabilizer composition containing DAHP and perchlorate.

Example 6

A. Experimental

The ingredients from the formula tabulated in Table XII in Part B below were subjected to the same "Roll Milling", "Dynamic Color Testing" and "Congo Red Test" procedure as described above for Experiment 3.

Part B. Formulae

TABLE XII

| Composition | 6A (PHR) | Comparative 6B (PHR) |
|---|---|---|
| PVC K66 | 100 parts | 100 parts |
| DAHP | 0.1 parts | 0.1 parts |
| Sodium perchlorate | 0.1 parts | 0.1 parts |
| Zeolite | 0.3 parts | 0.3 parts |
| Sodium acetate | 0.2 parts | Nil |
| PE wax | 1.0 parts | 1.0 parts |
| Calcium stearate | 0.5 parts | 0.5 parts |
| Calcium carbonate | 3.0 parts | 3.0 parts |

Part C. Results

TABLE XIII

| Formulations | 6A | Comparative 6B |
|---|---|---|
| The 10-Minute Dynamic Color* | 2 | 4 |
| Congo Red Time | 29 Minutes | 23 Minutes |

*Dynamic color is rated as: 1-excellent; 2-good; 3-fair; 4-poor; 5-very bad.

Both color hold and long-term stability performance are remarkably improved by further addition of sodium acetate (a metal carboxylate) into the comparative stabilizer composition containing DAHP and perchlorate.

Example 7

A. Experimental

The ingredients from the formula tabulated in Table XIV in Part B below were subjected to the same "Roll Milling", "Dynamic Color Testing" and "Congo Red Test" procedure as described above for Experiment 3.

Part B. Formulae

TABLE XIV

| Composition | 7A (PHR) | Comparative 7B (PHR) |
|---|---|---|
| PVC K66 | 100 parts | 100 parts |
| DAHP | 0.1 parts | 0.1 parts |
| Sodium perchlorate | 0.1 parts | 0.1 parts |
| Hydrotalcite | 0.3 parts | 0.3 parts |
| HTMPD* | 0.05 parts | Nil |
| PE wax | 1.0 parts | 1.0 parts |
| Calcium stearate | 0.5 parts | 0.5 parts |
| Calcium carbonate | 3.0 parts | 3.0 parts |

*HTMPD: 1-(2'-hydroxyethyl)-2,2,6,6,-Tetramethyl-4-piperidinol.

Part C. Results

TABLE XV

| Formulations | 7A | Comparative 7B |
|---|---|---|
| The 10-Minute Dynamic Color* | 2 | 4 |
| Congo Red Time | 26 Minutes | 27 Minutes |

*Dynamic color is rated as: 1-excellent; 2-good; 3-fair; 4-poor; 5-very bad.

The color hold performance is significantly improved by addition of a tiny quantity of HTMPD (a sterically hindered amine) into the comparative stabilizer composition containing DAHP and perchlorate.

Applications

The disclosed stabiliser compositions provide a stabiliser for thermally stabilising halide-containing polymers such as polyvinyl chloride. Advantageously, when in admixture with a halide-containing polymer, the stabiliser composition at least partly inhibits thermal degradation of the polymer.

The disclosed stabiliser composition is free from metals such as lead, cadmium, tin, barium, antimony, and zinc.

The disclosed stabiliser composition may be used as a substitute for lead stabilisers, tin stabilisers, mixed metal stabilisers and known organic stabilisers.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A composition comprising:
   a halide-containing polymer; and
   a stabilizer composition comprising one or more compounds represented by the general formula (I):

(I)

wherein
   X, Y, and Z are each independently selected from the group consisting of hydrogen, alkyl, alkenyl, alkynyl, amino, and groups having the structure (II)

(II)

$$R_1 \\ | \\ -N-R_2$$

wherein $R_1$ and $R_2$ are each independently selected from the group consisting of hydrogen, alkyl, alkenyl, alkynyl, cycloalkyl, cycloalkenyl, phenyl, phenylalkyl and aryl,
   A is oxygen (O) or sulfur (S);
   wherein the dashed double line represents an optional double bond; and
   wherein the stabilizer composition is at least partially bound to the halide-containing polymer to thereby at least partly inhibit thermal degradation of said halide-containing polymer.

2. A composition as claimed in claim 1, further comprising one or more additives selected from the group consisting of: polyol compounds, alkali metal compounds, alkaline earth metal compounds, alkali carboxylate compounds, alkaline earth carboxylate compounds, alkali zeolite compounds, fatty acids, hydrotalcite compounds, perchlorate compounds, phosphite compounds, hypophosphite compounds, β-diketone compounds, sterically hindered amine compounds, alkanolamine compounds, glycidyl compounds, phenolic antioxidant compounds and one or more combinations thereof.

3. A composition as claimed in claim 1, further comprising one or more lubricants.

4. A composition as claimed in claim 3, wherein the lubricant is selected from the group consisting of: glycerol monooleate, glyceryl mono stearate, glycerol dioleate, glycerol monostearate, fatty alcohols having chain lengths in the range from $C_{16}$ to $C_{18}$, phthalic acid esters of fatty alcohols having chain lengths in the range from $C_{16}$ to $C_{18}$, hydrogenated castor oil, esters of polyhydric alcohols, monocarboxylic acids, ethylene glycol dilaurate, 2-ethylhexane diol-1,3-distearate, ethylene glycol di-2-ethylhexanoate, octylene glycol dicaprylate, esters of dicarboxylic acids with short chain monohydroxy-alcohols, polyethylene waxes, paraffin waxes, carboxylic acids, stearic acid; carboxylates calcium stearate, magnesium stearate, sodium stearate, amides and one or more combinations thereof.

5. A composition as claimed in claim 1, wherein two or more compounds of formula (I) are linked together by a covalent bond.

6. A composition as claimed in claim 5, wherein the two or more compounds of formula (I) are linked by a covalent bond between the A atoms.

7. A composition as claimed in claim 5, wherein the two or more compounds of formula (I) are linked by a covalent bond between nitrogen atoms of X, Y, or Z.

8. A composition as claimed in claim 1, wherein the compound of formula (I) is an amino-substituted hydroxyl-pyrimidine compound.

9. A composition as claimed in claim 8, wherein the compound of formula (I) is a diamino-hydroxypyrimidine.

10. A composition as claimed in claim 9, wherein the compound of formula (I) is 2,4,diamino-6-hydroxypyrimidine.

11. A composition as claimed in claim 1, wherein X, Y, Z, $R_1$ and $R_2$ are each independently selected from the group consisting of lower alkyl, lower alkenyl, and lower alkynyl.

12. A composition as claimed in claim 1, wherein the halide-containing polymer is a chlorine-containing polymer.

13. A composition as claimed in claim 1, wherein the compound has a general structure represented by formula (IA):

(IA)

14. A composition as claimed in claim 1, wherein the compound has a general structure represented by formula (IB):

(IB)

15. A composition as claimed in claim 1, wherein the compounds of formula (I) are present in the polymer composition within the range of about 0.01% to about 20% by weight.

16. A composition as claimed in claim 1, wherein the compounds of formula (I) are present in the polymer composition within the range of about 0.05% to about 1% by weight.

17. A composition as claimed in claim 2, wherein the additives are present in the polymer composition within the range of about 0.1% to 15% by weight.

18. A composition as claimed in claim 3, wherein the lubricants are present in the polymer composition within the range of about 0.1% to 20% by weight.

19. A composition as claimed in claim 12, wherein the chlorine-containing polymer is polyvinyl chloride.

20. A polyvinyl chloride resin composition comprising polyvinyl chloride resin and a heat stabilising effective amount of a stabilizer composition comprising compounds represented by the general formula (I):

(I)

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl, A is oxygen (O) or sulfur (S);

wherein the dashed double line

"===="

represents an optional double bond; and wherein the stabilizer composition is at least partially bound to the polyvinyl chloride resin to thereby at least partly inhibit thermal degradation of said polyvinyl chloride resin.

21. A method of preparing stabilised halide-containing polymers comprising the steps of:

mixing a material comprising halide-containing polymer resin and a composition according to a stabilizer composition comprising compounds represented by the general formula (I):

(I)

wherein X, Y, and Z are each independently selected from the group consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl, A is oxygen (O) or sulfur (S);

wherein the dashed double line

"===="

represents an optional double bond; and heating the mixed material for a period so as to at least partially bind the halide-containing resin and stabiliser composition.

22. A composition as claimed in claim 1 wherein said halide-containing polymer is a chlorine-containing polymer.

23. A stabilised chlorine-containing polymer made by the method of claim 21.

24. A composition comprising;
a halide-containing polymer;
a stabilizer composition comprising one or more compounds represented by the general formula (I):

(I)

wherein
X, Y, and Z are each independently selected from the group, consisting of hydrogen, alkyl, alkenyl, alkynyl, amino, and groups having the structure (II)

(II)

wherein $R_1$ and $R_2$ are each independently selected from the group consisting of hydrogen, alkyl, alkenyl, alkynyl, cycloalkyl, cycloalkenyl, phenyl, phenylalkyl and aryl;

A is oxygen (O) or sulfur (S); and wherein the dashed double line

"===="

represents an optional double bond; and
a metal perchlorate salt, wherein the stabilizer composition is at least partially bound to the halide-containing polymer to thereby at least partly inhibit thermal degradation of said halide-containing polymer.

25. A composition as claimed in claim 24, further comprising an alkanolamine.

26. A composition as claimed in claim 24, wherein said metal perchlorate salt has the formula:

$M(ClO_4)_n$ wherein
M is a metal selected from the group consisting of: Li, Na, K, Mg, Ca, Sr, Zn, Al, La and Ce, and
n is 1, 2 or 3.

27. A composition as claimed in claim 24, wherein said metal perchlorate salt is at least one of sodium perchlorate and potassium perchlorate.

28. A composition as claimed in claim 25, wherein the alkanolamine is selected from the group consisting of: ethanolamine, tris-ethanolamine, propanolamine, tris-propanolamine, butanolamine, tris(2-hydroxy-1-propyl)amine, tris(2-hydroxy-ethyl)amine, bis(2-hydroxyethyl) (2-hydroxy-1-propyl)amine, bis(2-hydroxy-1-propyl) (2-hydroxyethyl) amine, mono (2-hydroxy-ethyl)amine, bis(2-hydroxy-ethyl) amine, mono(2-hydroxy-1-propyl)amine, bis(2-hydroxy-1-propyl)amine and mixtures thereof.

29. A composition as claimed in claim 24, wherein the compound has a general structure represented by formula (IA):

(IA)

30. A composition as claimed in claim 24, wherein the compound has a general structure represented by formula (IB):

(IB)

31. A composition as claimed in claim 24 or claim 25, further comprising a polyol.

32. A composition as claimed in claim 24 or claim 25, further comprising a metal carboxylate.

33. A composition as claimed in claim 24 or claim 25, further comprising a sterically hindered amine.

* * * * *